United States Patent Office 2,739,121
Patented Mar. 20, 1956

2,739,121

THICKENED HYDROPHOBIC LUBRICATING COMPOSITIONS

Adolf Weihe, Kronberg (Taunus), and Otto Schweitzer, Frankfurt am Main, Germany, assignors to Deutsche Gold- und Silber-Scheideanstalt vormals Roessler, Frankfurt am Main, Germany No Drawing. Application December 15, 1952, Serial No. 326,138

Claims priority, application Germany December 14, 1951

10 Claims. (Cl. 252—25)

This invention relates to the manufacture of thickened hydrophobic lubricating compositions.

It has already been proposed to prepare thickened lubricating compositions by incorporating in lubricating oils silica prepared in the gaseous phase and other highly dispersed inorganic oxides or hydroxides. The resultant compositions are remarkable in that they do not, like most lubricating compositions, show a high dependence of viscosity or consistency on temperature. This is of considerable practical importance in cases where, as for example in friction bearings, the most constant possible lubricating action over a wide temperature range is required.

Such thickened lubricating compositions, generally called "greases" have, however, the disadvantage that they, unlike ordinary grease, have a certain susceptibility to water, which manifests itself disadvantageously in that the lubricating film may be destroyed by separation into its components on contact with water or steam.

It is an object of the invention to provide thickened lubricating compositions of this nature having a substantially reduced susceptibility to water.

It has been unexpectedly found according to the invention, that lubricating compositions thickened with highly dispersed oxides or hydrated oxides of silicon, titanium, aluminum, iron and the like which have a substantially reduced susceptibility to water can be prepared by subjecting them to the action of compounds which react with alcoholic hydroxyl groups by poly addition. The isocyanates which belong to such group of compounds have been found to be especially adapted for the purposes of the invention. The mono-, di- and tri-isocyanates can be employed according to the invention, but in general the di-isocyanates are preferable. The isocyanates have the advantage that they render the oxides or hydrated oxides employed as thickening agents hydrophobic at low or only slightly raised temperatures.

A second group of compounds which form poly addition products with alcoholic hydroxyl groups are epoxy compounds having terminal ethylene oxide groups, for example, the epoxide formed by reacting 4,4' dihydroxy diphenyl methane with epichlorhydrin of the formula

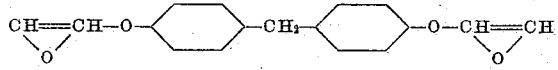

as well as its higher homologues in which other hydrocarbon radicals are replaced for the $CH_2$ groups. This group of compounds are known in commerce under the name "Araldite."

Especially good results are obtained when finely dispersed oxides, preferably of silica which are formed in a vapor phase reaction as an aerosol and collected as an aerogel are employed as the thickening agents for the lubricating compositions according to the invention. For example, a silica product especially suitable for the purposes of the invention can be obtained by decomposing vaporized silicon tetrachloride in a flame of a fuel whose combustion products contain water and permitting the resulting silica aerosol to cool to form an aerogel.

In a preferred embodiment of the invention, the compounds which form poly addition products with alcoholic hydroxyl groups are added to the mixtures of the liquid lubricant and finely dispersed oxide in small quantities, for example up to about 2% of isocyanate with reference to the lubricant-thickening mixture. It could not be foreseen that the addition of small quantities of such compounds to a previously prepared thickened lubricant would produce the desired hydrophobic effect even with relatively small additions. It is assumed that such compounds which are dissolved in the liquid lubricant, for example, machine oil, are taken up by the surface of the finely divided oxide and are presumably bound through a topochemical reaction by the hydroxyl groups.

The quantity of the compounds such as the isocyanates added to the thickened lubricating composition as well as the temperature at which they are permitted to act on such composition can be varied depending upon the degree of hydrophobicity desired.

If, for example, a thickened lubricant is desired which will withstand a 48 hour boiling with water without losing its lubricating qualities, di- or poly-isocyanates in somewhat larger quantity, for example, about 1% can be added and the mixture heated to about 100° C. If, on the other hand, the stability of the thickened lubricant against water at 60° C. for only several hours is required, it will suffice to employ a mono-isocyanate, for example, phenylisocyanate, in a quantity substantially below 1%.

In carrying out the invention, the finely divided oxide, for example, silica produced in the vapor phase by thermal decomposition, can be mixed with machine oil in a fast-running three-roll mill. By passing the mixture through the mill 2 or 3 times, a homogeneous grease in the form of a substantially transparent salve is obtained. The additional compound imparting a hydrophobic character to the thickened lubricant such as an isocyanate can be added gradually drop by drop during the mixing process and the resulting mixed product is then heated for some time, whereby the strong odor of the isocyanate disappears completely.

In accordance with another modification of the invention, the thickening agents can be treated with the additional compounds imparting hydrophobic character, such as the isocyanates prior to admixture with the liquid lubricant. For example, the finely divided oxides employed as thickening agents can be treated with a vaporized isocyanate before being mixed with the lubricant. It was found, however, that slightly larger quantities of the pretreated thickening agents were required in some instances to obtain the same thickening effect. If such additional compounds are added during the mixing of the lubricant-thickening agent mixture or after such mixing, no increase in quantity of the thickening agent is required.

The thickened lubricant compositions according to the invention can be prepared from the lubricating oils normally employed, for example, mineral oils, such as, machine oils, synthetic oils, animal and vegetable oils and silicone oils.

The lubricating compositions according to the invention present a very considerable technical advance. It is possible to obtain excellent solid lubricating compositions in a simple manner, which, for example, can be used for a long time in bearings and which do not deteriorate under the influence of water, for example, condensed water. A further advantage of the isocyanates resides in that slight contamination of the liquid lubricant with water or residues of moisture on the surface of the thickening agent are securely bound by the isocyanates. Consequently, the addition of isocyanates, besides imparting a hydrophobic action, also ensures that the resulting thickened lubricant is practically free from water.

In the same manner certain compounds with a hydrophobic action which are known to react with alcoholic hydroxyl groups may be used accordingly, i. e. beta-propiolactone, diketene and di-allylidene-pentaerythritol acetal (see Zeit. Ang. Chemie 62, pages 113 and 118, 1950).

The following examples will serve to illustrate the invention.

Example 1

A mixture of 90 parts of machine oil and 10 parts of finely divided silica obtained by the vapor phase decomposition of silicon tetrachloride was homogenized on a three-roll mill. After running through the mill twice, 2 parts of toluylene di-isocyanate were added to the salve-like mass while still moving and after subsequent mixing, the mass was placed in a tightly closed vessel and heated to 60° C. for 4 hours. The grease obtained had a consistency identical with that of a grease to which the di-isocyanate had not been added. However, when spread in a thin film on a coper sheet, the grease was not destroyed by boiling for 48 hours in water and the film still retained its lubricating qualities.

Example 2

A mixture of 88 parts of machine oil and 12 parts of the finely divided silica referred to in Example 1 was homogenized in a funnel mill provided with porcelain discs. After the mixture had been run through twice, 0.25 part of phenyl isocyanate were added. The temperature of the mass rose to about 40° C. during the third passage through the mill which sufficed to render the phenyl isocyanate effective. The resulting hydrophobic grease withstood a five hours' treatment with water at 50° C. without losing its lubricating qualities.

Example 3

A mixture of 89 parts of machine oil and 11 parts of finely divided silica prepared in the same manner as in Example 1 were homogenized in a kneading pump capable of being heated. 1.5 parts of a tri-isocyanate prepared in a known manner from rosaniline base were added and the kneading pump was heated to 80–85° C. After two hours, the tri-isocyanate had reacted and the thickened lubricant was ready for use. It resisted 20 hours' boiling with water without losing its lubricating qualities.

Example 4

A mixture of 90 parts of machine oil and 10 parts of finely divided silica obtained by the vapor phase decomposition of silicon tetrachloride was homogenized in a three-roll mill. After running through the mill twice 2.5 parts of beta-propiolactone (manufactured according to U. S. P. 2,356,459 Kung) were added to the salve like mass still moving and after subsequent mixing, the mass was placed in a tightly closed vessel and heated to about 45° C. After boiling for 6 hours in water the lubricating qualities were the same as in Example 1.

Example 5

A mixture of 88 parts of machine oil and 12 parts of the finely divided silica referred to in Example 4 was homogenized in a funnel mill provided with porcelain discs. After the mixture had been run through twice, 0.38 part of diketene were added. The temperature was raised to about 75° C. during the operation. The resulting hydrophobic grease withstood a five hours' treatment with water at 50° C. without losing its lubricating qualities.

Example 6

A mixture of 89 parts of machine oil and 11 parts of finely divided silica prepared in the same manner as in Example 1 were homogenized in a kneading pump capable of being heated. 2.2 parts of di-allylidene pentaerythritol acetal were added and the kneading pump was heated to about 100° C. After 2 to 3 hours the reaction was finished and the thickened lubricant was ready for use. It resisted 8 hours' boiling with water without losing its lubricating properties.

Example 7

To a mixture prepared according to Example 1, 2.5 parts of the glycidylic ether of a bivalent phenol according to the formula

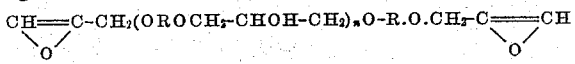

whereby R represents the bivalent hydrocarbon radical of the bivalent phenol, are added and the reaction finished according to Example 1. The grease was not destroyed by boiling for 10 hours in water and the film spread on a thin copper sheet retained its lubricating qualities.

We claim:

1. A thickened lubricant comprising a lubricating oil thickened with highly dispersed finely divided compound in the form of an aerogel selected from the group consisting of oxides and hydrated oxides of silicon, titanium, aluminum and iron rendered water-resistant by the action of a compound which is capable of forming poly addition products with alcoholic hydroxyl groups selected from the group consisting of epoxy compounds containing a terminal ethylene oxide group, organic isocyanates, beta propiolactone, diketene and di-allylidene pentaerythritol acetal.

2. A thickened lubricant comprising a lubricating oil thickened with highly dispersed finely divided compound in the form of an aerogel selected from the group consisting of oxides and hydrated oxides of silicon, titanium, aluminum and iron rendered water-resistant by the action of an organic isocyanate.

3. A thickened lubricant comprising a lubricating oil thickened with highly dispersed finely divided compound in the form of an aerogel selected from the group consisting of oxides and hydrated oxides of silicon, titanium, aluminum and iron rendered water-resistant by the action of an organic di-isocyanate.

4. A thickened lubricant comprising a lubricating oil thickened with highly dispersed finely divided compound in the form of an aerogel selected from the group consisting of oxides and hydrated oxides of silicon, titanium, aluminum and iron rendered water-resistant by the action of an epoxy compound containing a terminal ethylene oxide group.

5. A thickened lubricant according to claim 1 in which said highly dispersed compound is a compound obtained as an aerogel by a vapor phase thermal decomposition.

6. A thickened lubricant according to claim 1, in which said highly dispersed compound is silica obtained as an aerogel by thermal decomposition of a volatilized silicon compound.

7. In a process for the production of a lubricant oil thickened with a finely divided highly dispersed compound in the form of an aerogel selected from the group consisting of oxides and hydrated oxides of silicon, titanium, aluminum and iron, the step which comprises treating such finely divided compound with a compound which is capable of forming poly addition products with alcoholic hydroxyl groups selected from the group consisting of epoxy compounds containing a terminal ethylene oxide group, organic isocyanates, beta propiolactone, diketene and di-allylidene pentaerythritol acetal to render such compound water-resistant.

8. In a process for the production of a thickened lubricant composition comprising a lubricant oil and a highly dispersed finely divided compound in the form of an aerogel selected from the group consisting of oxides and hydrated oxides of silicon, titanium, aluminum and iron as a thickening agent, the step which comprises incorporating up to 2% of a compound capable of forming poly addition products with alcoholic hydroxyl groups selected from the group consisting of epoxy compounds containing a terminal ethylene oxide group, organic isocyanates, beta propiolactone, diketene and di-allylidene pentaerythritol acetal in such lubricant composition to render said composition resistant to the action of water.

9. In a process for the production of a thickened lubricant composition comprising a lubricant oil and a highly dispersed finely divided compound in the form of an aerogel selected from the group consisting of oxides and hydrated oxides of silicon, titanium, aluminum and iron as a thickening agent, the step which comprises incorporating up to 2% of an organic isocyanate in such lubricant composition to render said composition resistant to water.

10. In a process for the production of a thickened lubricant composition comprising a lubricant oil and a highly dispersed finely divided compound in the form of an aerogel selected from the group consisting of oxides and hydrated oxides of silicon, titanium, aluminum and iron as a thickening agent, the steps which comprise treating said finely divided compound with an organic isocyanate in vaporized form to render said compound water-resistant and thickening a lubricant oil with said pretreated water-resistant compound.

References Cited in the file of this patent

UNITED STATES PATENTS

| | | |
|---|---|---|
| 2,563,606 | Kimberlin et al. | Aug. 7, 1951 |
| 2,573,650 | Peterson | Oct. 30, 1951 |
| 2,583,603 | Sirianni et al. | Jan. 29, 1952 |
| 2,583,604 | Sirianni et al. | Jan. 29, 1952 |
| 2,583,605 | Sirianni et al. | Jan. 29, 1952 |
| 2,583,606 | Sirianni et al. | Jan. 29, 1952 |
| 2,584,085 | Stross | Jan. 29, 1952 |
| 2,594,822 | Stross et al. | Apr. 29, 1952 |
| 2,599,683 | Abrams et al. | June 10, 1952 |
| 2,623,852 | Peterson | Dec. 30, 1952 |
| 2,623,853 | Stross | Dec. 30, 1952 |
| 2,625,508 | Stross | Jan. 13, 1953 |
| 2,629,691 | Peterson | Feb. 24, 1953 |
| 2,635,078 | Stross et al. | Apr. 14, 1953 |